United States Patent [19]

Sano et al.

[11] Patent Number: 5,472,060
[45] Date of Patent: Dec. 5, 1995

[54] DRIVE TRAIN USED IN A STEERING APPARATUS FOR REAR WHEELS OF A VEHICLE

[75] Inventors: Osamu Sano, Kashihara; Shigehisa Matsushita, Nara; Ryuichi Komine, Kashihara, all of Japan

[73] Assignee: Koyo Seiko Co., Ltd., Osaka, Japan

[21] Appl. No.: 142,051

[22] Filed: Oct. 28, 1993

[30] Foreign Application Priority Data

| Oct. 29, 1992 | [JP] | Japan | 4-291657 |
| Dec. 25, 1992 | [JP] | Japan | 4-347192 |
| Sep. 13, 1993 | [JP] | Japan | 5-227442 |

[51] Int. Cl.$^6$ ............................................. B62D 5/04
[52] U.S. Cl. ..................... 180/79.1; 180/140; 180/154
[58] Field of Search ............................ 180/79.1, 140, 180/149, 154; 280/91

[56] References Cited

U.S. PATENT DOCUMENTS

| 4,758,012 | 7/1988 | Ogura et al. | 280/91 |
| 4,893,688 | 1/1990 | Morishita | 180/79.1 |
| 4,987,963 | 1/1993 | Oslapas et al. . | |
| 5,002,142 | 3/1991 | Klosterhaus | 180/79.1 |
| 5,033,566 | 7/1991 | Moretti et al. | 280/91 X |
| 5,044,454 | 9/1991 | Kanazawa et al. | 180/79.1 |
| 5,249,638 | 10/1993 | Watanabe et al. | 180/79.1 |
| 5,265,691 | 11/1993 | Konishi et al. | 180/148 |
| 5,314,036 | 5/1994 | Kato et al. | 180/79.1 |

FOREIGN PATENT DOCUMENTS

| 0207773 | 8/1988 | Japan | 180/79.1 |
| 0020475 | 1/1990 | Japan | 180/79.1 |

*Primary Examiner*—Kenneth R. Rice
*Assistant Examiner*—Victor E. Johnson
*Attorney, Agent, or Firm*—Popham, Haik, Schnorbrich & Kaufman, Ltd.

[57] ABSTRACT

A drive train of a steering apparatus for rear wheels of a vehicle transmits a driving force of a rotary motor to a steering shaft of rear wheels that is shiftable in the axial direction. The drive train comprises a reduction mechanism driven by the motor and a converting mechanism driven by the reduction mechanism for converting rotational motion of the motor to a linear motion for steering the rear wheels. The reduction mechanism includes a worm driven by the motor and a worm wheel driven by the worm. The converting mechanism comprises a trapezoidally-threaded screw mechanism including a trapezoidally-threaded female screw member and trapezoidally-threaded male screw member. One of the trapezoidally-threaded male and female screw members is driven by the worm wheel, and the other fixed to the steering shaft of rear wheels. A transmission efficiency of an input from the steering shaft of rear wheels to the trapezoidally-threaded screw mechanism is set to be zero. It is preferable to provide a backlash adjusting mechanism for adjusting a backlash of the trapezoidally-threaded screw mechanism.

2 Claims, 14 Drawing Sheets

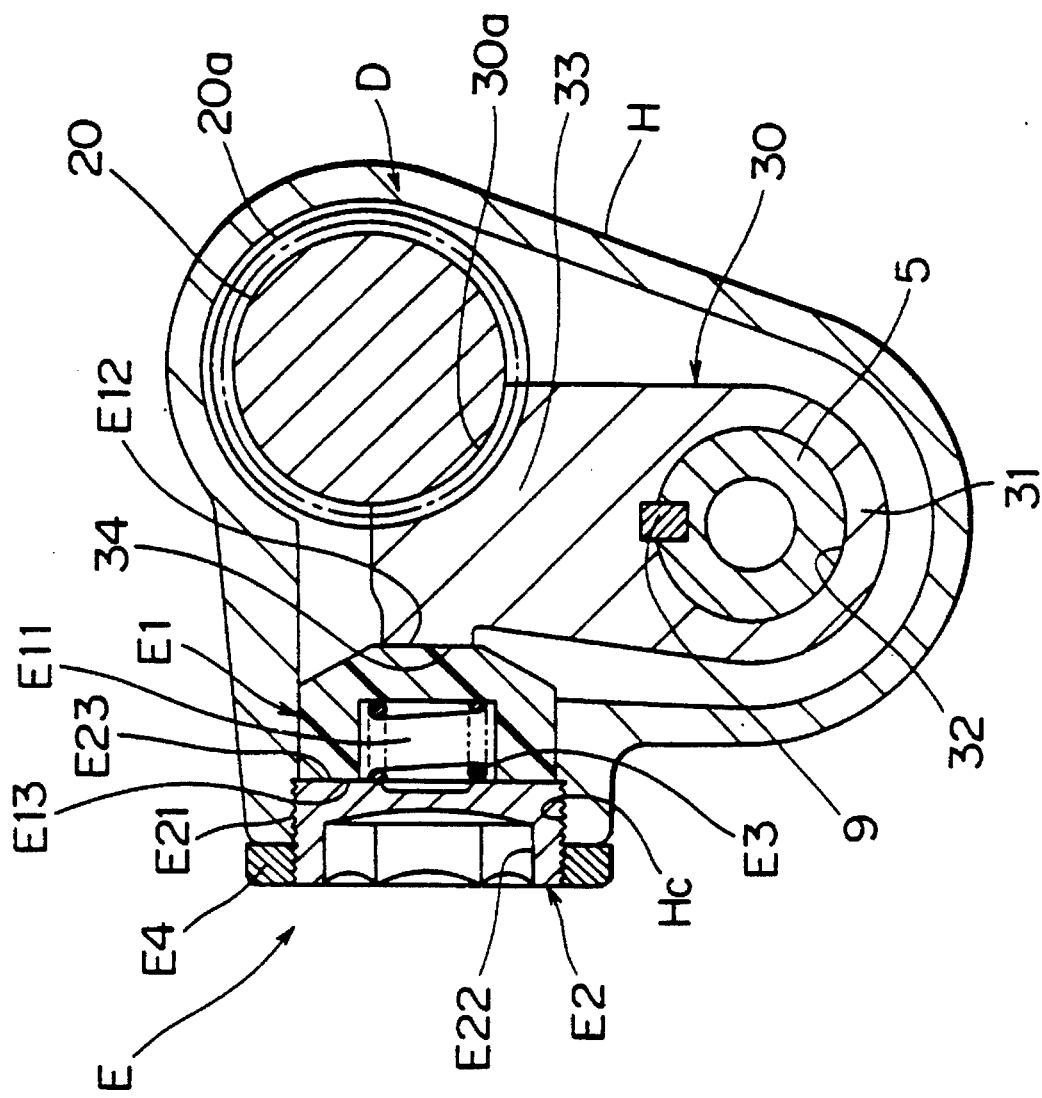

5,472,060

DRIVE TRAIN USED IN A STEERING APPARATUS FOR REAR WHEELS OF A VEHICLE

BACKGROUND OF THE INVENTION

1. Field of the Invention

The present invention is applied to an apparatus for steering rear wheels of a four-wheel steering vehicle by shifting a steering shaft of the rear wheels in the axial direction by means of a driving force of a rotary motor, and relates to a drive train used in a steering apparatus for rear wheels of a vehicle for transmitting the driving force of the motor to the steering shaft of the rear wheels.

2. Related Art

When a failure is caused in the electrical systems of existing four-wheel steering vehicles, including failures in the electric motors and sensors, the steering shaft of the rear wheels is reset by a centering spring to a neutral position that is neither in-phase (where the steering direction of rear wheels would be the same as that of the front wheels) nor reverse-phase (where the steering direction of the rear wheels would be opposite to that of the front wheels). In other words, existing four-wheel steering vehicles rely on a fail-safe concept of resetting the rear wheels to the neutral position in case of emergency.

However, with known four-wheel steering vehicles:

i) In order to obtain a sufficient resetting force to the neutral position, it is necessary to increase the load to the centering spring. Accordingly, an output of the motor must be increased, and certain losses are caused.

ii) In a conventional fail-safe method, when the rear wheels are suddenly operated and returned to the neutral position in emergencies, the resetting operation might affect adversely the driving performance of the vehicle, and as a result of this problem, such a conventional method is not always preferable.

SUMMARY OF THE INVENTION

Hence, it is an object of the invention to provide a drive train used in a steering apparatus for rear wheels of a vehicle, arranged in a simple structure and capable of achieving a superior fail-safe mode without increasing the motor output.

In order to achieve the above object;
1) A drive train for a steering apparatus of the rear wheels of a vehicle according to an aspect of the invention is operated by shifting a steering shaft of the rear wheels in the axial direction by means of the driving force of a rotary motor, in order to transmit the driving force of the motor to the steering shaft of the rear wheels. The drive train comprises:

a reduction mechanism driven by the rotary motor, and
a converting mechanism, driven by the reduction mechanism, for converting a rotational motion of the motor to a linear motion for steering of the rear wheels, wherein the reduction mechanism includes
worm driven by the motor, and
a worm wheel driven by the worm.

The converting mechanism comprises a trapezoidally-threaded screw mechanism.

A transmission efficiency of the trapezoidally-threaded screw mechanism in combination with the reduction mechanism when a driving force is transmitted from the steering shaft of the rear wheels through the combination to the motor is set to zero.

The trapezoidally-threaded screw mechanism includes a trapezoidally-threaded male screw member having a male screw portion with a trapezoid thread formed in an outer circumference thereof, and a trapezoidally-threaded female screw member having a female screw portion with a trapezoid thread formed in an inner circumference thereof for engagement with said male screw portion.

One of the trapezoidally-threaded male and female screws members is driven by said worm wheel, and the other is fixed to the steering shaft of the rear wheels.

In accordance with the above-described aspect of the invention, the steering apparatus for the rear wheels is shifted by the motor through the reduction mechanism and trapezoidally-threaded screw mechanism, and the rear wheels are steered to a desired steering angle. Because the trapezoidally-threaded screw mechanism has a low transmission efficiency for an input of driving force from the steering shaft of the rear wheels (hereinafter referred to as reverse transmission efficiency), in case of emergency when the motor is rendered inoperative due to a failure in an electric system or the like, the rear wheels can be maintained at a steering angle of that moment. Thus, it is preferred for fail-safe purposes, since unnecessarily sudden movement are avoided during driving. Moreover, a conventional centering spring can be eliminated. Accordingly, the structure can be further simplified, and it is not required to unnecessarily increase the motor output. Specifically, since the trapezoidally-threaded screw mechanism is combined with a worm gear mechanism, the following advantage is provided: When the reverse transmission efficiency of the trapezoidally-threaded screw mechanism cannot be reduced sufficiently, the total reverse transmission efficiency of the trapezoidally-threaded screw mechanism in combination with the worm gear mechanism can be set to zero by adjusting a reduction gear ratio of the worm gear mechanism. Therefore, a higher degree of designing freedom is provided.

2) In a preferred embodiment:

The trapezoidally-threaded female and male screw members are tubular, and are provided concentrically with the steering shaft of the rear wheels.

The trapezoidally-threaded female screw member is rotatable supported by a housing of the steering apparatus for rear wheels; and the trapezoidally-threaded male screw member is placed inside in the diametral direction of said trapezoidally-threaded female screw member, and fixed to the steering shaft of the rear wheels.

According to the above aspect of the invention, because the trapezoidally-threaded male screw member is placed inside in the diametral direction of the trapezoidally-threaded female screw member, the space for placing the trapezoidally-threaded screw mechanism can be reduced. Accordingly, reduction in size of a drive train, and therefore a steering apparatus for the rear wheel, can be achieved.

3) In another embodiment, a backlash adjusting mechanism for adjusting a backlash of said trapezoidally-threaded screw mechanism is further provided. According to this aspect of the invention, the rear wheels can be steered without any delay in the transmission of rotational motion from the motor. Hence, the steering stability can be increased. In addition, noise caused by a backlash of the trapezoidally-threaded screw mechanism can be prevented.

4) In a further aspect of this invention, the backlash adjusting mechanism includes an elastic biasing member for biasing the trapezoidally-threaded male screw member toward the trapezoidally-threaded female screw member so that the male and female screw portions are elastically pressed against each other, thus maintaining contact between respective engagement portions of the screw members.

5) In another aspect of the invention, the backlash adjusting mechanism comprises a sliding member slidable in a predetermined direction against a housing of the steering apparatus for rear wheels, with the sliding member being placed between the elastic biasing member and a member that has a steering shaft rotation preventing means for preventing the steering shaft of rear wheels from rotating relative to the housing of the steering apparatus for the rear wheels.

According to the above aspect of the invention, the sliding member of the backlash adjusting mechanism prevents rotation of the steering shaft of the rear wheels relative to the housing of the steering apparatus. Therefore, since it is not required to provide separate means for preventing the steering shaft of rear wheels from rotating relative to the housing, the overall structure can be simplified.

BRIEF DESCRIPTION OF THE DRAWINGS

FIG. 14 is a sectional view along a line 14—14 of FIG. 12.

DETAILED DESCRIPTION OF THE PREFERRED EMBODIMENTS

By referring to the attached drawings showing the different embodiments, the invention is described in detail below.

FIRST EMBODIMENT

Figure 1:
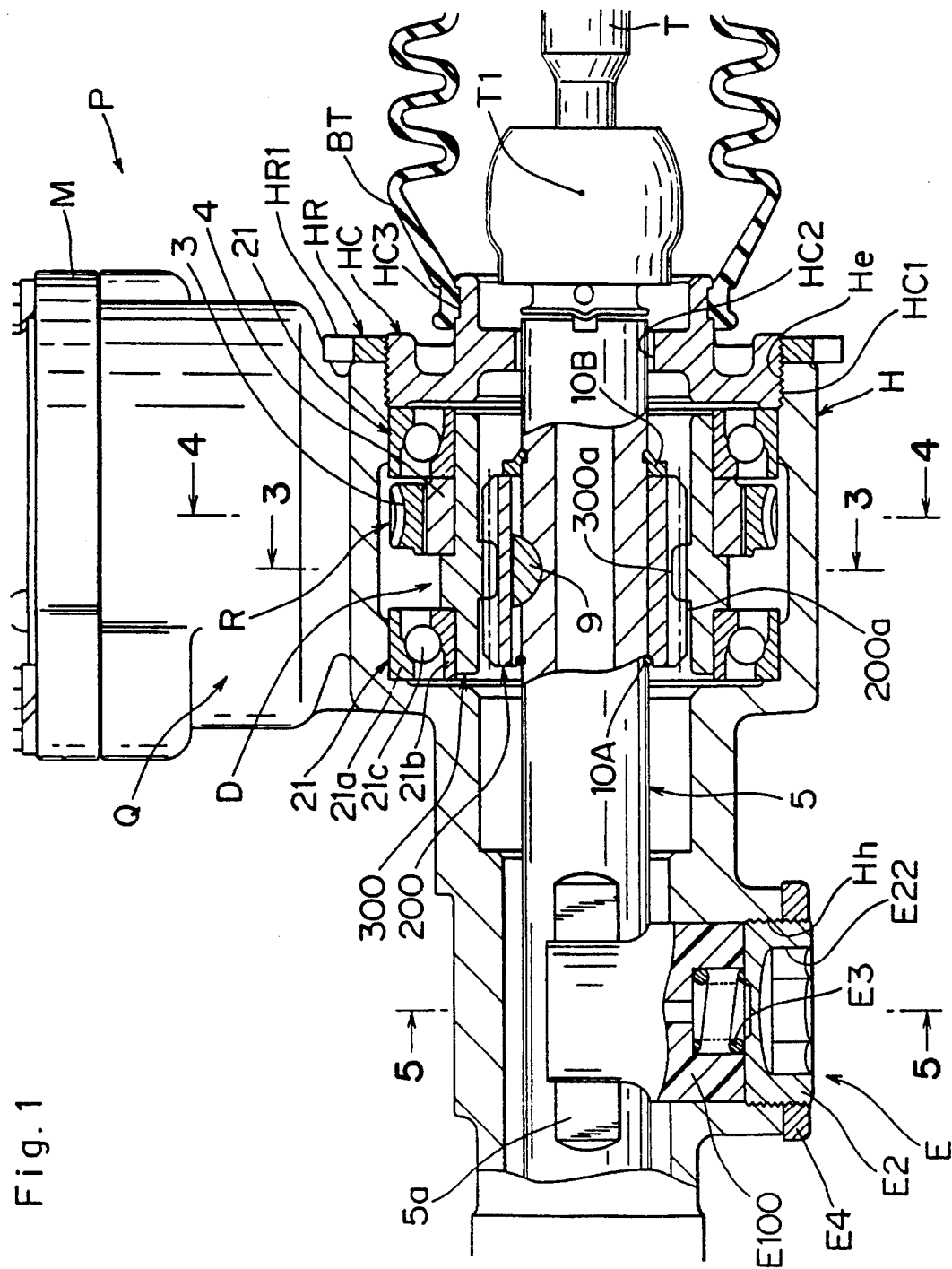
FIG. 1 is a partially sectioned side view showing main parts of a steering apparatus for rear wheels including a drive train according to a first embodiment of the invention.
Figure 2:
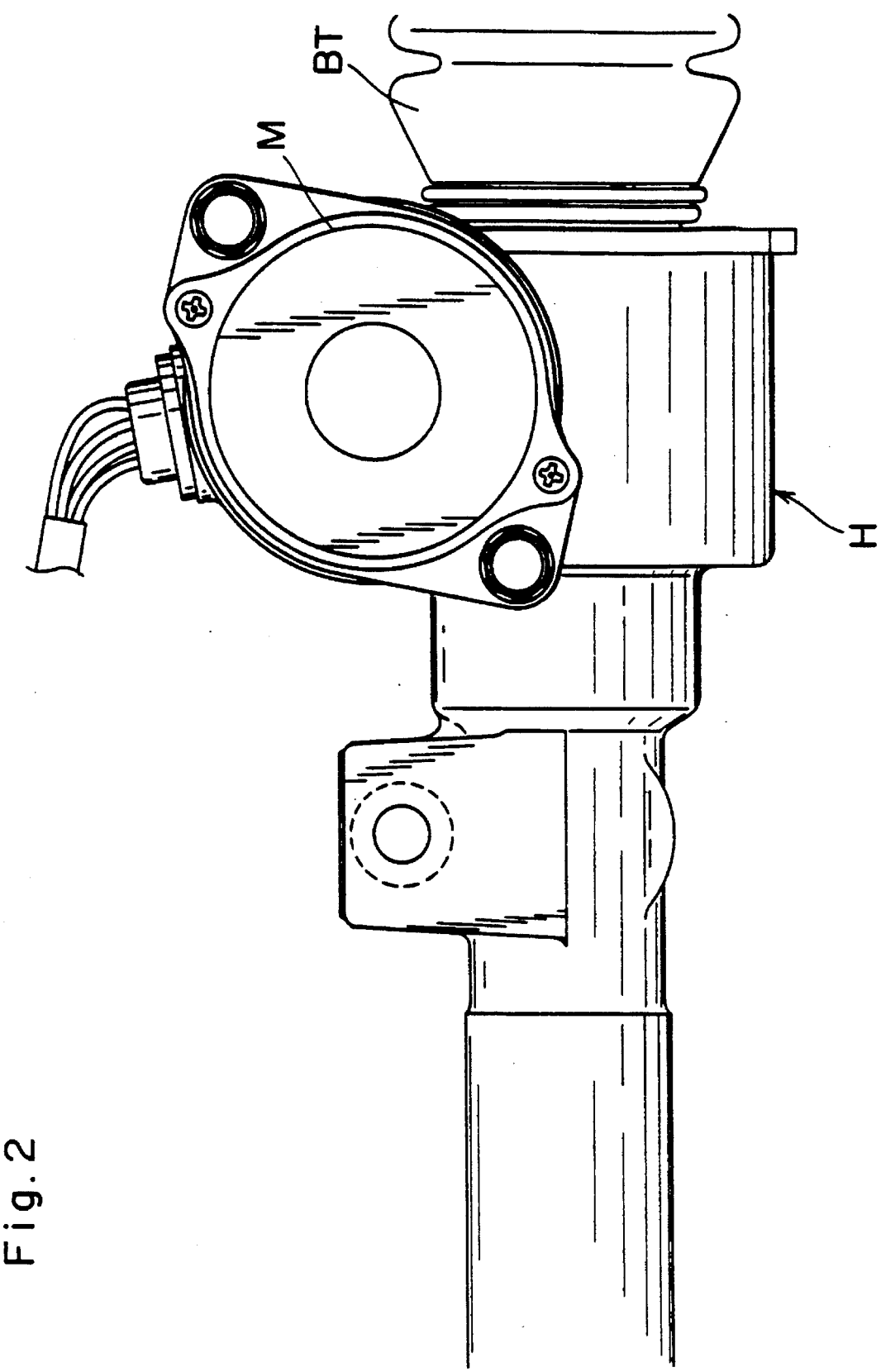
FIG. 2 is a plan view showing main parts of a steering apparatus for rear wheels.
Figure 3:
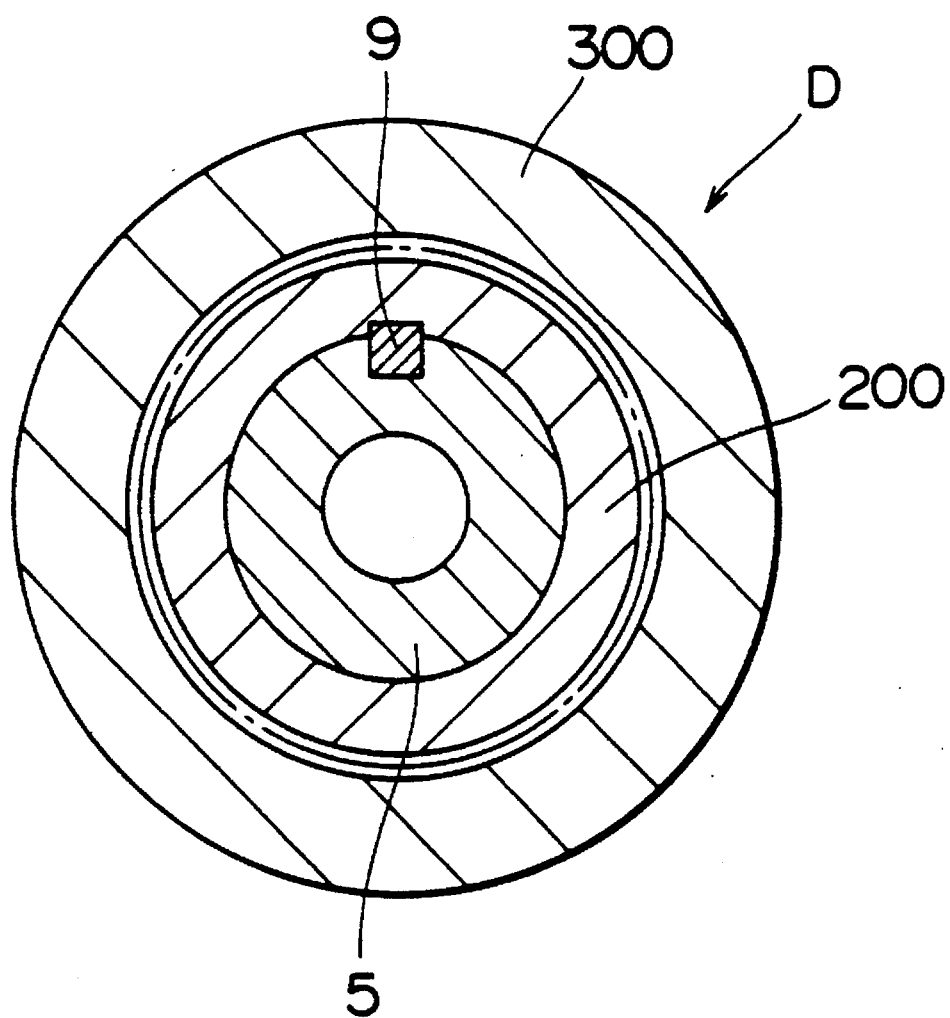
FIG. 3 is a sectional view along a line 3—3 of FIG. 1, showing a trapezoidally-threaded screw mechanism and a steering shaft of the rear wheels.
Figure 4:
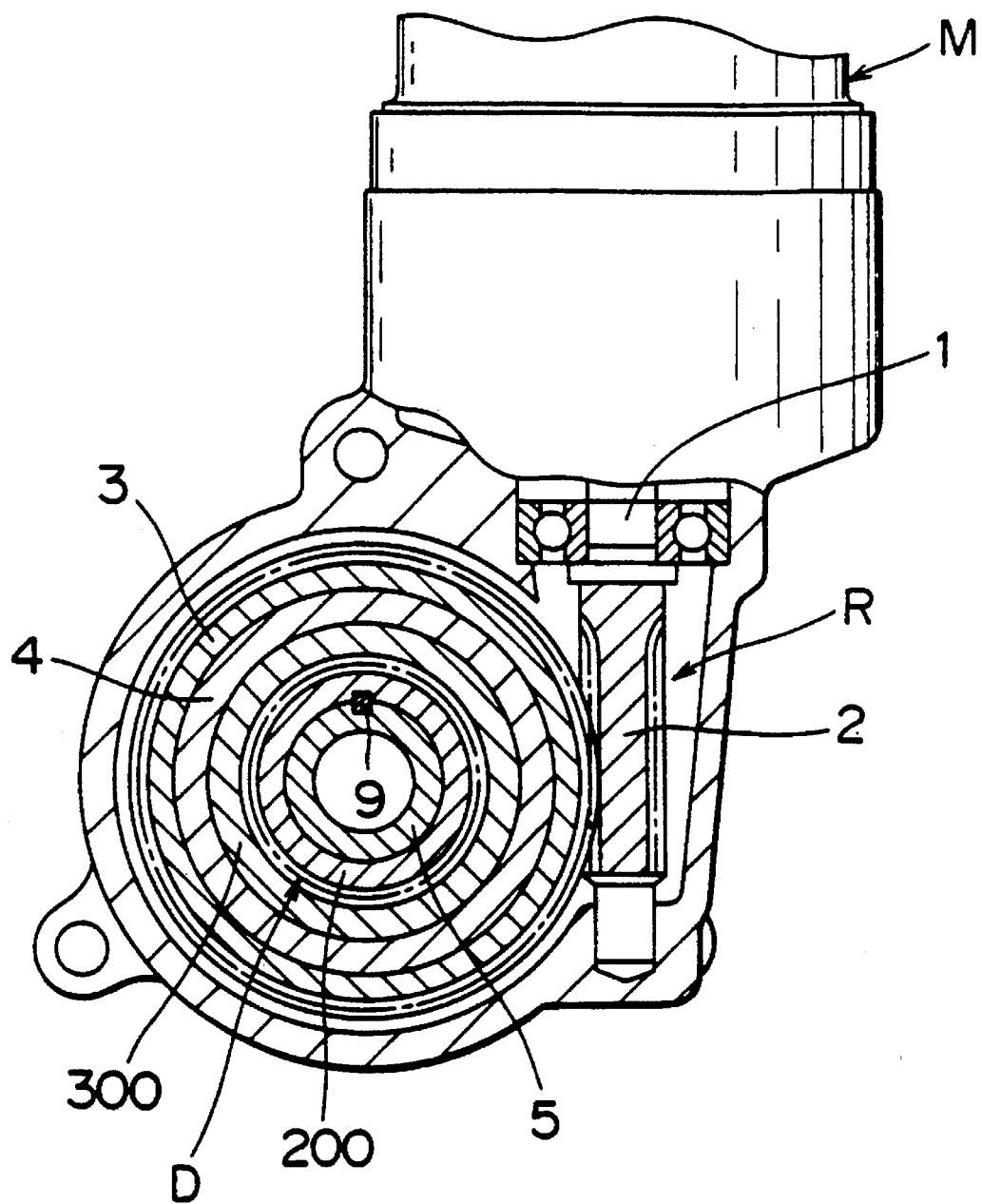
FIG. 4 is a sectional view along a line 4—4 of FIG. 1, showing a reduction mechanism and trapezoidally-threaded screw mechanism.

A first embodiment of the invention is described in detail by referring to FIGS. 1–5. A drive train Q of the embodiment is applied to a steering apparatus P for the rear wheels of a vehicle. In FIGS. 1 and 4, the steering apparatus Q for the rear wheels comprises: 1) a housing H fixed to a vehicle, 2) a rotary motor M, 3) a reduction mechanism R including a worm 2 and worm wheel 3, and being driven by the motor M, 4) a trapezoidally-threaded screw mechanism D including a trapezoidally-threaded male screw member 200 and trapezoidally-threaded female screw member 300, 5) a steering shaft 5 of the rear wheels, driven by the trapezoidally-threaded screw mechanism D for shifting in the axial direction (in the horizontal direction in FIG. 1), and steering the rear wheels (not shown) through a tie rod T, and 6) a backlash adjusting mechanism E for removing backlash of the trapezoidally-threaded screw mechanism D. The drive train Q is composed of the reduction mechanism R and the trapezoidally-threaded screw mechanism D. The reverse transmission efficiency (the transmission efficiency when an input from the steering shaft 5 of the rear wheels is transmitted to the motor M) of the drive train Q is set to zero.

The steering shaft 5 of rear wheels and tie rod T are connected by a universal joint (not shown) with a joint center T1.

In the steering apparatus P for the rear wheels, a rotational motion of the motor M is applied to the trapezoidally-threaded screw mechanism D through the reduction mechanism R, and converted to a linear motion along the steering shaft 5 of the rear wheel by the trapezoidally-threaded screw mechanism D, thereby steering the rear wheels.

Referring to FIG. 1, the housing H is a cylindrical member with the steering shaft 5 of the rear wheels inserted therethrough, and the trapezoidally-threaded screw mechanism D, reduction mechanism R and worm wheel 3 are placed about the steering shaft 5 of rear wheel inside the housing H. The housing H rotatably supports the trapezoidally-threaded female screw member 300 through a pair of angular ball bearings 21. The angular ball bearings are provided with an outer annular ring 21a fixed to an inner surface of the housing H, an inner annular ring 21b fixed to an outer circumferential surface of the trapezoidally-threaded female screw member 300 and plural balls 21c interposed between the rings 21a and 21b, respectively.

The rings 21b are positioned in the axial direction in relation to the trapezoidally-threaded female screw member 300 in such manner that the inner rings 21b are spaced from each other by a predetermined distance. One outer ring 21a is positioned in the axial direction in relation to the housing H, and the other outer ring 21a is pressed in the approaching direction to the one outer ring 21a by a cap HC that will be described later. In such a state, a pre-load required is applied to the angular ball bearing 21.

In a right end surface of the housing H, an opening is provided, and a female screw is formed in an inner circumferential surface of the opening. The opening of housing H is approximately closed by the cap HC having an annular shape with the steering shaft 5 of the rear wheels inserted therethrough. In an outer circumferential surface of the cap HC, a male screw HC 1 is formed for engagement with the female screw He of housing H. The cap HC has a through hole HC2 for accepting the steering shaft 5 of rear wheels that is inserted therethrough. A slight gap is employed between an inner circumferential surface of the through hole HC2 and an outer circumferential surface of the steering apparatus 5 for rear wheels. A boot holding part HC3 that is covered and held by an end of rubber boot member BT having a bellow-like shape and covering a circumference of a connecting part between the steering shaft 5 of the rear wheels and the tie rod T is formed on an end of the cap HC.

The cap HC is fastened, as it is screwed into the end of female screw He, to the housing H by a lock nut HR. In an outer circumference of the lock nut HR, plural radial projections HR1 are formed. The lock nut HR is rotated by fitting a specified claw tool (not shown) to the projections HR1.

As described above, the cap HC is abutted to an end surface of the outer ring 21a of one angular ball bearing 21, and applies, in such state, a pre-load required to the angular ball bearing 21. The pre-load is easily adjustable by varying the amount that cap HC is screwed into female screw He.

In FIGS. 1 and 3, the trapezoidally-threaded female screw member 300 comprises a cylindrical member positioned concentrically about the steering shaft 5 of rear wheels. The worm wheel 3 is connected so as to be integrally rotatable through a cylindrical fitting member 4 to an outer circumferential part of the trapezoidally-threaded female screw member 300. In a central part in the axial direction of the trapezoidally-threaded female screw member 300, a female screw portion 300a with a trapezoid thread is formed over an entire circumference of the inner circumferential surface. The worm wheel 3 has an annular shape. As shown in FIG. 4, the worm 2 engaged with the worm wheel 3 is coupled with an output shaft 1 of the motor M, and integrally rotated with the output shaft 1.

In FIGS. 1 and 3, the trapezoidally-threaded male screw member 200 comprises a cylindrical member placed between an inner circumferential part of the trapezoidally-threaded female screw member and an outer circumferential part of the steering shaft 5 of rear wheels. The trapezoidally-threaded male screw member 200 is positioned concentrically with the steering shaft 5 of the rear wheels. In an outer circumference of the trapezoidally-threaded male screw member 200, a trapezoidally-threaded male screw portion 200a that engages with the female screw portion 300a is formed over the entire circumference. The trapezoidally-threaded male screw member 200 is keyed and connected to the steering shaft 5 of the rear wheels by means of a woodruff key 9, and relative rotation between the trapezoidally-threaded male screw member 200 and steering shaft 5 of the rear wheels is thereby controlled. In addition, shifting in the axial direction of the trapezoidally-threaded male screw member 200 in relation to the steering shaft 5 of the rear wheel is controlled by a snap ring 10A and a caulking member 10B. The snap ring 10A and caulking member 10B are fixed to a pair of outer circumferential grooves in the steering shaft 5 of the rear wheels, respectively, and abutted to either end of the trapezoidally-threaded male screw member 200, respectively.

In a preferred embodiment, the trapezoid thread making up the male screw portion 200a and female screw portion 300a, is a trapezoid thread of JIS 30 deg. with 6 mm of lead.

Figure 5:
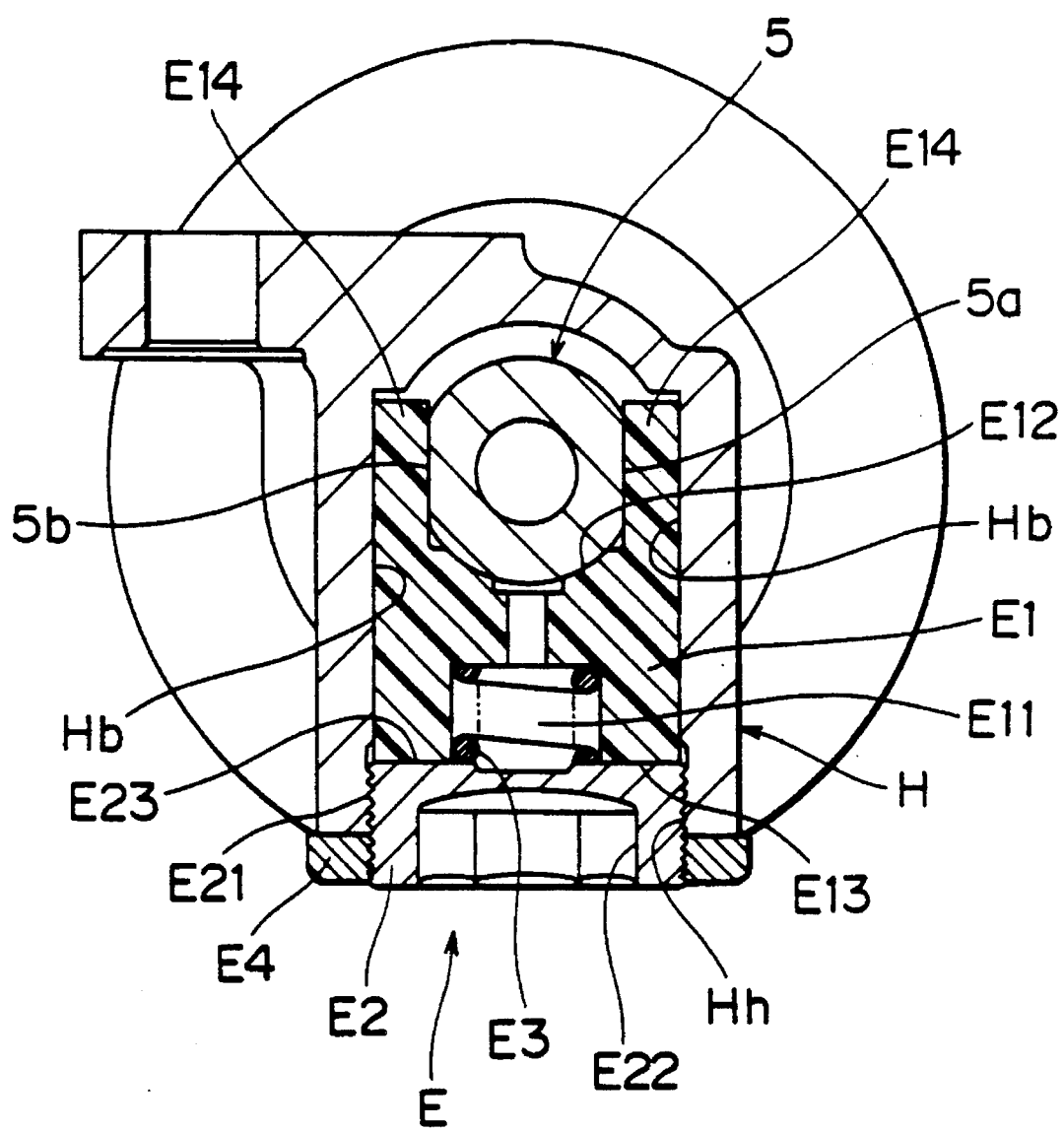
FIG. 5 is a sectional view along a line 5—5 of FIG. 1, showing a backlash adjusting mechanism.

Referring now to FIGS. 1 and 5, the backlash adjusting mechanism E is described. The backlash adjusting mechanism E is provided for reducing play in the thread engagement of the trapezoidally threaded mechanism to be zero or close to zero by pressing the trapezoidally-threaded male screw member 200 towards the trapezoidally-threaded female screw member 300 in the diametral direction through the steering shaft 5 of the rear wheels. The backlash adjusting mechanism E comprises a sliding member E1 of a resin abutted to the steering shaft 5 of the rear wheels, a threaded member E2 locked in a tapped hole Hh that is formed in the housing H, a compression coil spring E3 interposed between the threaded member E2 and the sliding member E1, and serving as forcing means for pressing the sliding member E1 against the steering shaft 5 of rear wheels and a lock nut E4 for fastening the threaded member E2 to the housing H.

The sliding member E1 has a concave part E11, opening into one end of an end portion thereof, for accommodating the coil spring. In the other end portion of the sliding member E1, a pair of U-shaped clamping parts E14 is provided for clamping a pair of flat surfaces 5a, 5b of the steering shaft 5 of rear wheels. The pair of flat surfaces 5a, 5b are spaced from each other at a predetermined width in the direction of the axial length of the steering shaft 5 of the rear wheels, and are parallel with each other. As the clamping parts E14 are compressed between the flat surfaces 5a, 5b and inner surfaces Hb, Hb of opposing portions of housing H, the flat surfaces 5a, 5b are pressed by clamping parts E14. As a result, rotation of steering shaft 5 relative to the housing H is controlled. The sliding member E1 is made of, for example, a resin having a self-lubricating property such as oil-containing plastics. Therefore, even when the sliding member E1 is in engagement with the flat surfaces 5a, 5b for controlling rotation of the steering shaft 5 of rear wheels, it allows the steering shaft 5 of the rear wheels to be smoothly shifted in the axial direction.

Additionally, the sliding member E1 is provided with a concave pressing part E1 between the clamping parts E14 for abutting and applying a pressure to a circumferential surface of the steering shaft 5 of the rear wheels.

The threaded member E2 has a threaded part E21 in an outer circumference thereof and a wrench hole 22 in an end surface thereof, to which a hexagonal wrench for turning and operating the threaded member is introduced and fitted. A position for screwing the threaded member E2 in is set such that a predetermined spacing (for example, approximately 0.06 to 0.09 mm, although not shown) is obtained between an end surface ABBE of the threaded member E2 and an end surface E13 of the sliding member E1.

The compression coil spring E3 is, as it is accommodated in the concave part E11 for accommodating the coil spring in the sliding member E1, interposed between the end surface 23 of threaded member E2 and a bottom surface of the concave part E11 for accommodating the coil spring. The compression coil spring E3 elastically presses the trapezoidally-threaded male screw member 200 against the trapezoidally-threaded female screw member 300 through the sliding member E1 and steering shaft 5 of the rear wheels. Thus, the female and male screw portions 300a and 200a are pressed against each other, and play in the axial direction between the trapezoidally-threaded screw members 200 and 300 is eliminated. Specifically, even when the trapezoidally-threaded male screw member 200 or trapezoidally-threaded female screw member 300 is eccentrically rotated, the trapezoidally-threaded male screw member 200 is elastically forced against the female screw member such that the male screw portion 200a is pressed toward the female screw portion 300a.

Furthermore, when the trapezoidally-threaded male screw member 200 is subjected to a load from the steering shaft 5 of the rear wheels due to a collision of the rear wheels against a curb, stone or the like, and the trapezoidally-threaded male screw member 200 is thereby shifted in a diametral direction towards the trapezoidally-threaded female screw member 300, the sliding member E1 is brought into contact with the threaded member E2. Therefore, the load is received through the sliding member E1, threaded member E2 and housing H. In such an operation, because the sliding member E1 comprises a resin, it contracts elastically, and absorbs the impact. Hence, the screw portions 200a, 300a and the like are prevented from being damaged.

According to the above embodiment, the trapezoidally-threaded female screw member 300 is driven and rotated by the motor M through the reduction mechanism R; the trapezoidally-threaded male screw member 200 in engagement with the trapezoidally-threaded female screw member 300 is shifted in the axial direction integrally with the steering shaft 5 of rear wheels, and the rear wheels are steered, accordingly.

In addition, because the steering angle of the rear wheels is set at a relatively small angle (generally a few degrees), a force effecting to the rear wheels for bringing it back to a neutral position is low, and the reverse transmission efficiency of the drive train Q is zero. Therefore, in case of emergency when a failure is caused in the electrical system, the rear wheels are held at the steering angle at that time. This result is preferable for fail-safe purposes since no unnecessarily sudden movement is caused during driving.

An input from the steering shaft 5 of the rear wheels is to be transmitted through the trapezoidally-threaded screw mechanism D and a worm gear mechanism to the motor M. In this regard, because the worm gear mechanism is combined with the trapezoidally-threaded screw mechanism, the following advantages can be obtained: when the reverse transmission efficiency of the trapezoidally-threaded screw mechanism D cannot be reduced sufficiently, the reverse transmission efficiency of the entire drive train Q can be set to zero by adjusting a reduction gear ratio of the worm gear mechanism. Therefore, a higher degree of designing freedom is provided. In addition, by employing the worm gear mechanism, a higher reduction gear ratio can be achieved in a smaller size, in comparison with existing reduction gear mechanisms.

Moreover, because a conventional centering spring can be eliminated, the structure can be further simplified. Also, although it was required in the prior art to increase a motor output against the centering spring, it is not required to unnecessarily increase the output of the motor M in the embodiment, and reduction in size and weight is possible.

Furthermore, the male screw portion 200a of trapezoidally-threaded male screw member 200 is elastically forced toward the female screw portion 300a by the backlash adjusting mechanism E including the compression coil spring E3. Therefore, the female and male screw portions 300a and 200a are securely pressed against each other without being affected by an eccentric rotation and the like of the trapezoidally-threaded male screw member 200. As a result, any relative backlash in the axial direction between the trapezoidally-threaded male and female screw members 200 and 300 is eliminated. thus, the rotation motion of motor M can be converted without delay to a linear motion of the steering shaft 5 of the rear wheels. Accordingly, the steering stability can be increased, and a noise caused by a backlash is prevented.

In addition, relative rotation of the steering shaft 5 of the rear wheels to the housing H is controlled by the sliding member E1 of the backlash adjusting mechanism E. Therefore, it is not required to separately provide means for controlling the relative rotation of steering shaft 5 of the rear wheels, and the structure of drive train Q can be simplified.

EMBODIMENT 2

A second embodiment of the invention is shown in FIG. 6 through 9. In the figures, the main differences of this embodiment from FIG. 1 are described below.

Figure 6:
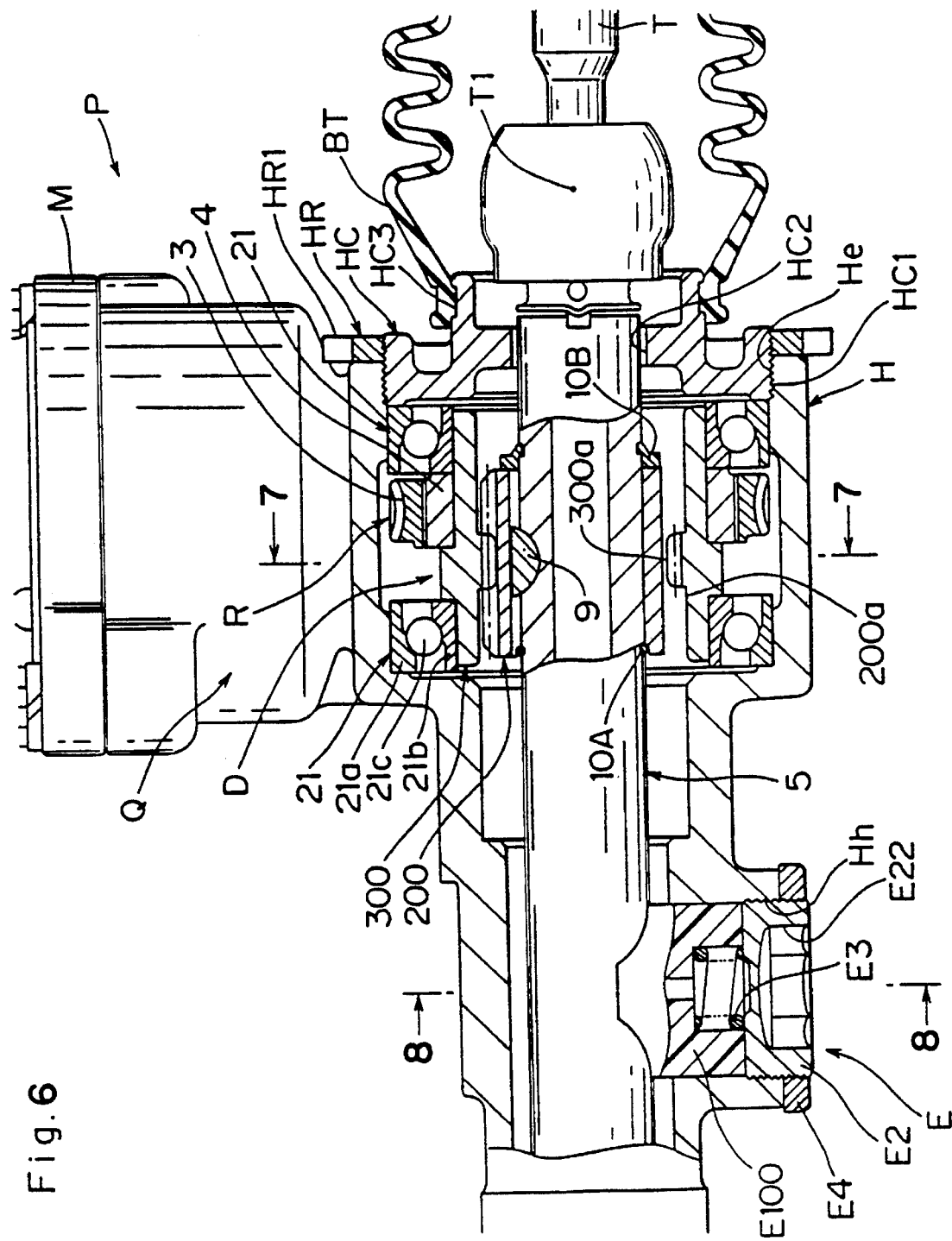
FIG. 6 is a partially sectioned side view showing main parts of a steering apparatus for the rear wheels including a drive train according to a second embodiment of the invention.
Figure 7:
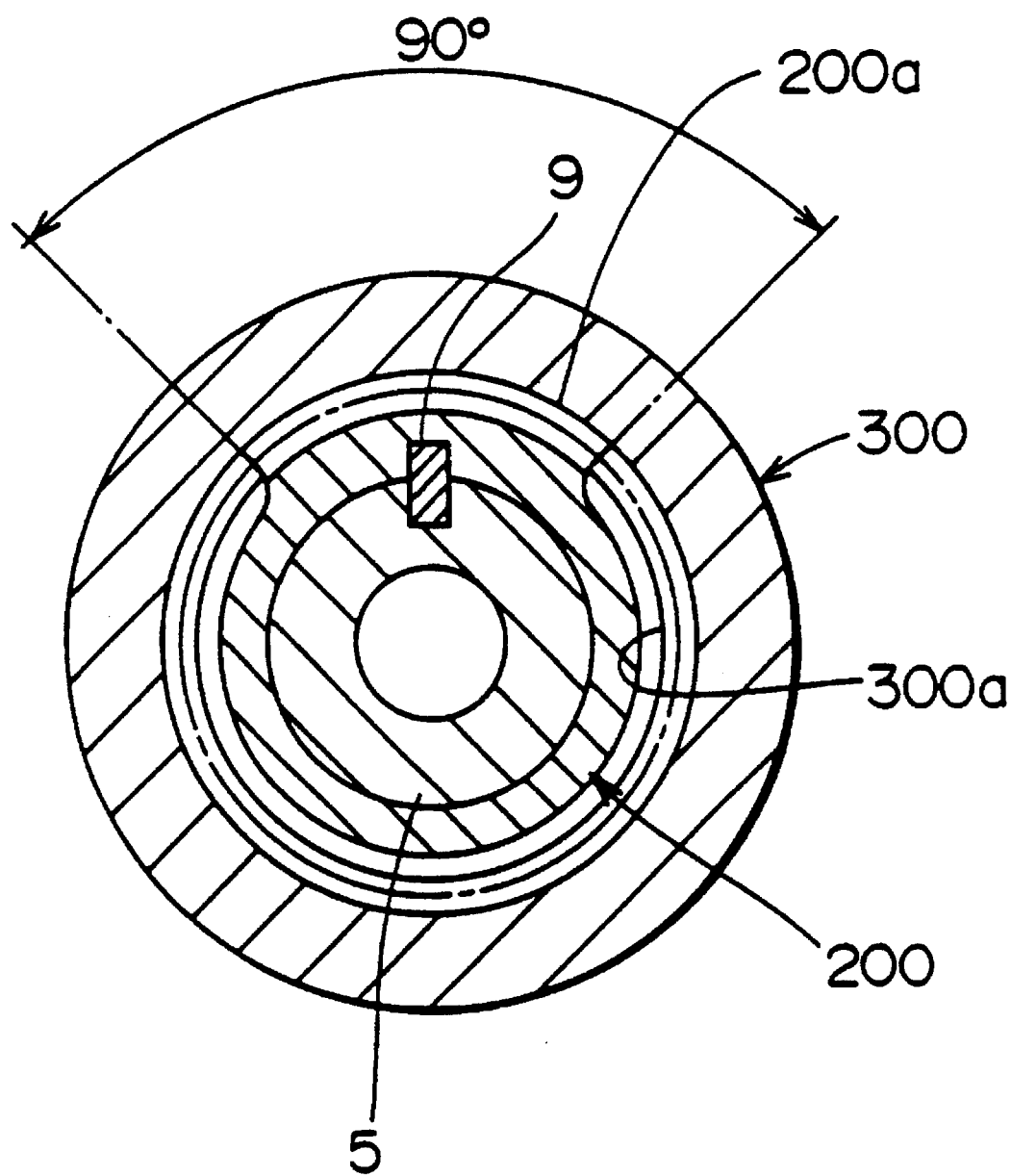
FIG. 7 is a sectional view along a line 7—7 of FIG. 6.
Figure 8:
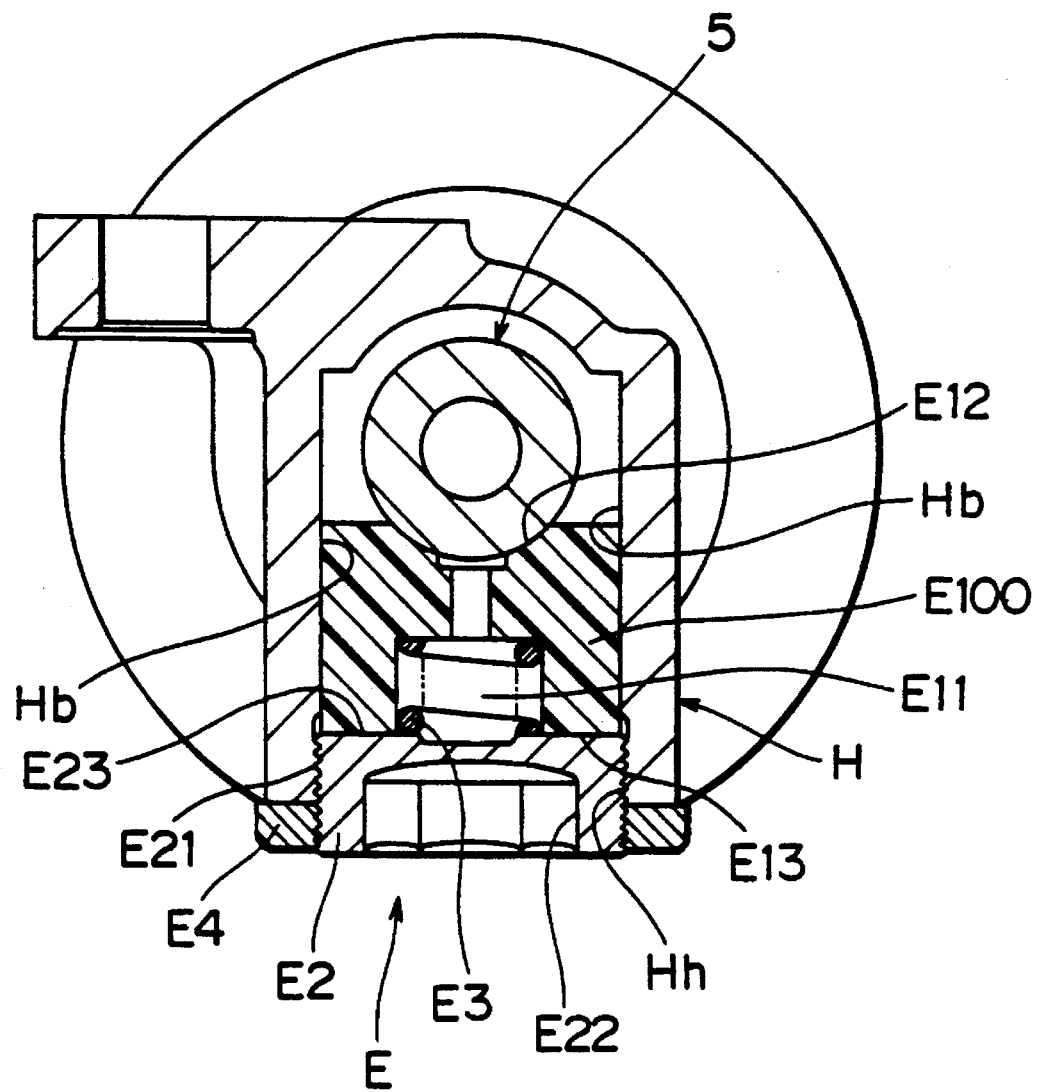
FIG. 8 is a sectional view along a line 8—8 of FIG. 6.

1) In FIGS. 6 and 7, a male screw portion 200a is formed only in a part ¼ of the circumference of trapezoidally-threaded male screw member 200. The male screw portion 20a is located in the opposite side of a backlash adjusting mechanism E in relation with a steering shaft 5 of the rear wheels, and pressed against a female screw portion 300a by means of the backlash adjusting mechanism E. As the part with the male screw portion 200a formed therein is limited, reduction of weight can be achieved. The male screw portion 200a may be formed over not more than a half circumference.

2) In the embodiment of FIG. 1, the sliding member E1 of the backlash adjusting mechanism E has the pair of clamping parts E14 for applying a pressure to the pair of flat surfaces 5a, 5b of the steering shaft 5 for the rear wheels, and relative rotation of the steering shaft 5 of the rear wheels to the housing H is thereby controlled. In other words, the backlash adjusting mechanism E serves also as a mechanism for controlling the rotation of steering shaft 5 of the rear wheels.

In comparison, in the second embodiment, a sliding member E100 of the backlash adjusting mechanism E has no clamping part, and doesn't serve to control rotation of the steering shaft 5 of rear wheels. In addition, the steering shaft 5 of the rear wheels is not provided with such pair of flat surfaces. In the second embodiment, a mechanism A for controlling relative rotation of the steering shaft 5 of the rear wheels to the housing is provided in a position spaced from the backlash adjusting mechanism E in the axial direction of steering shaft 5 of the rear wheels. Therefore, the pre-load for adjusting the backlash and the pre-load for preventing the steering shaft from rotating can be adjusted independently of each other.

Figure 9:
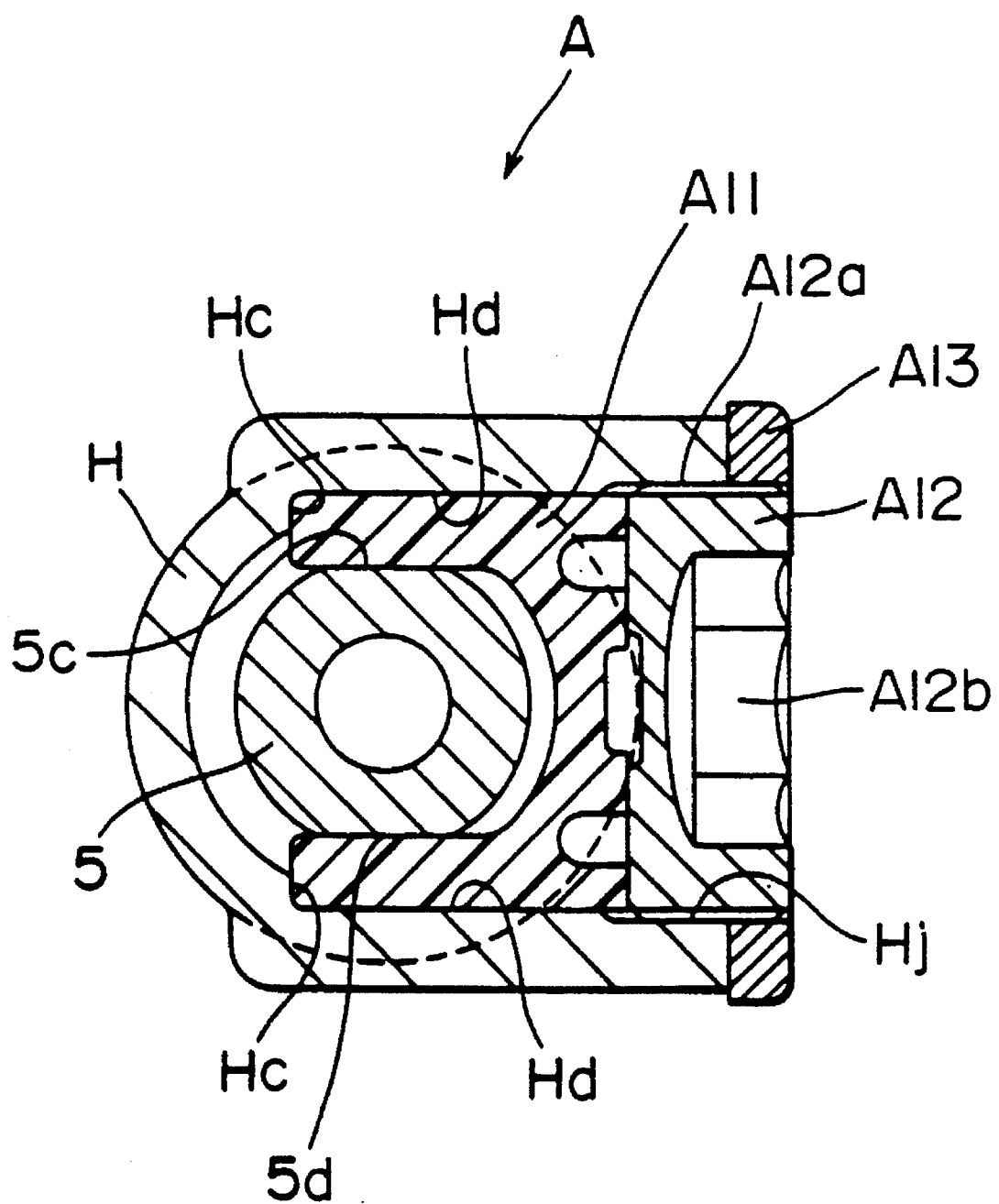
FIG. 9 is a sectional view showing a mechanism for controlling rotation of a steering shaft for the rear wheels relative to a housing.

In referring to FIG. 9, the mechanism A for such control comprises a pair of parallel flat surfaces 5c, 5d formed in an outer circumference of the steering shaft 5 of the rear wheels in a predetermined width in the direction of the axial length. An antirotation member A11 with an approximately U-shaped sectional surface fitted to the flat surfaces 5c, 5d with both flat surfaces 5c, 5d clamped thereby, a threaded member A12 as a pre-load application means screwed in a tapped hole Hj of a housing H for pressing and fixing the antirotation member A11 as it is abutted to inner surfaces Hc, Hd of the housing H and the flat surfaces 5c, 5d and a lock nut A13 screwed and engaged in the threaded member A12 so as to be pressure-contacted against a periphery of the tapped hole Hj for controlling rotation of the threaded member A12 in relation to the housing H.

The antirotation member A11 comprises a resin having a self-lubricating property such as oil-containing plastics, for example. Therefore, even when the antirotation member A11 is in engagement with the flat surfaces 5c, 5d for controlling rotation of the steering shaft 5 of the rear wheels, it allows the steering shaft 5 of the rear wheels to be smoothly shifted in the direction of its axial length.

The threaded member A12 as a pre-load application means comprises an embedded plug having a threaded part A12a in an outer circumference and a wrench hole A12 for introduction of and engagement with a hexagonal wrench in an end surface.

By adjusting the amount that the threaded member A12 is screwed in, the antirotation member A11 is subjected to a pre-load, and compressed and changed in shape between the inner surfaces Hc, Hd of housing H and the flat surfaces 5c, 5d. Consequently, a contact pressure of the antirotation member A11 to the flat surfaces 5c, 5d can be adjusted, accordingly. When installing the antirotation mechanism A, by adjusting a position of screwing the threaded member A12 in, while measuring a torque in the side of the steering shaft 5 of rear wheels or the worm 2, it can be easily adjusted to a desired pre-load, that is, a desired contact pressure.

Since other parts are identical to those of the embodiment in FIG. 1, they are depicted by using the same reference symbols in the figures, and not described here. With the second embodiment, operations and effects similar to those of the embodiment in FIG. 1 are provided.

THIRD EMBODIMENT

Figure 10:
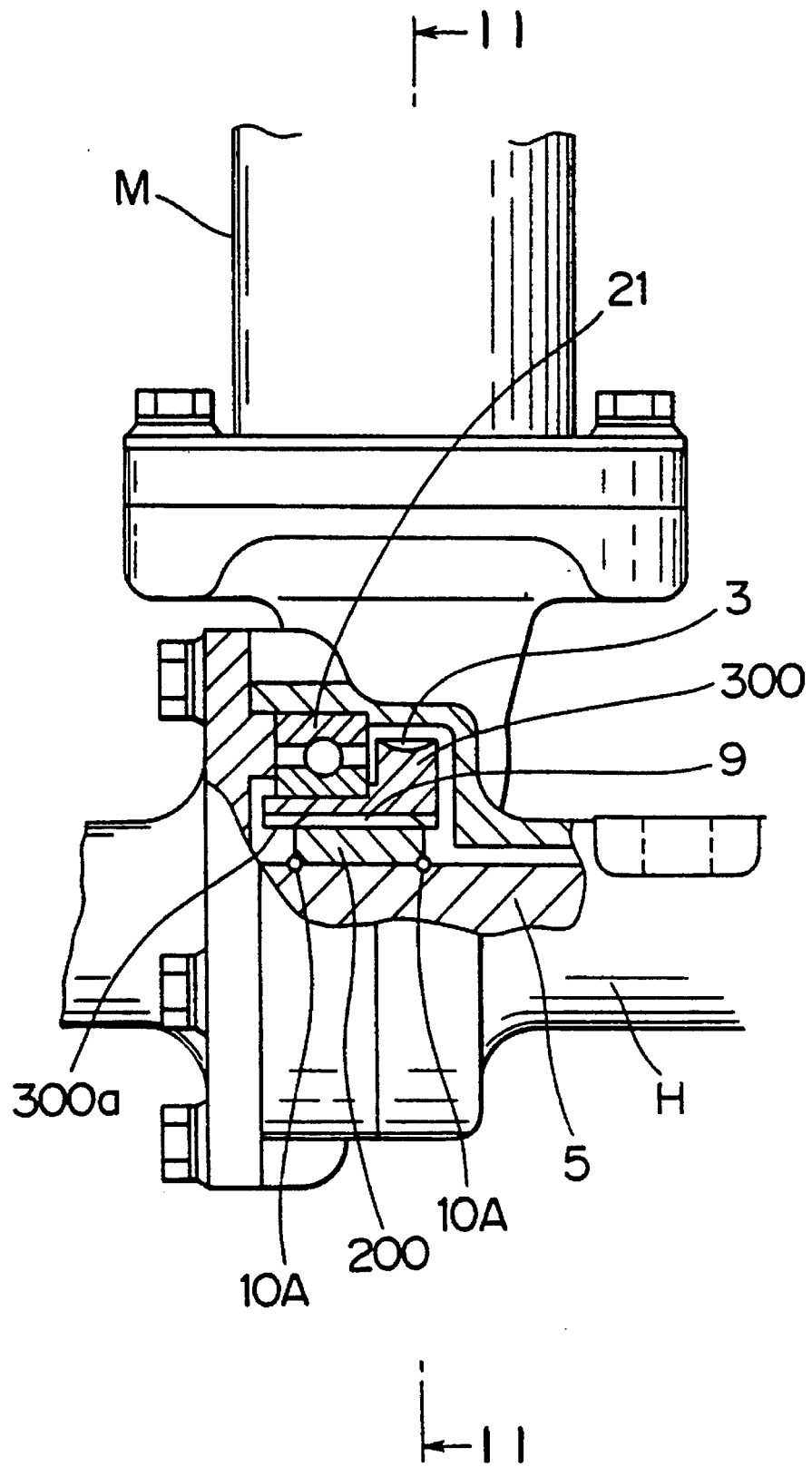
FIG. 10 is a partially sectioned side view showing main parts of a steering apparatus for the rear wheels including a drive train according to a third embodiment of the invention.
Figure 11:
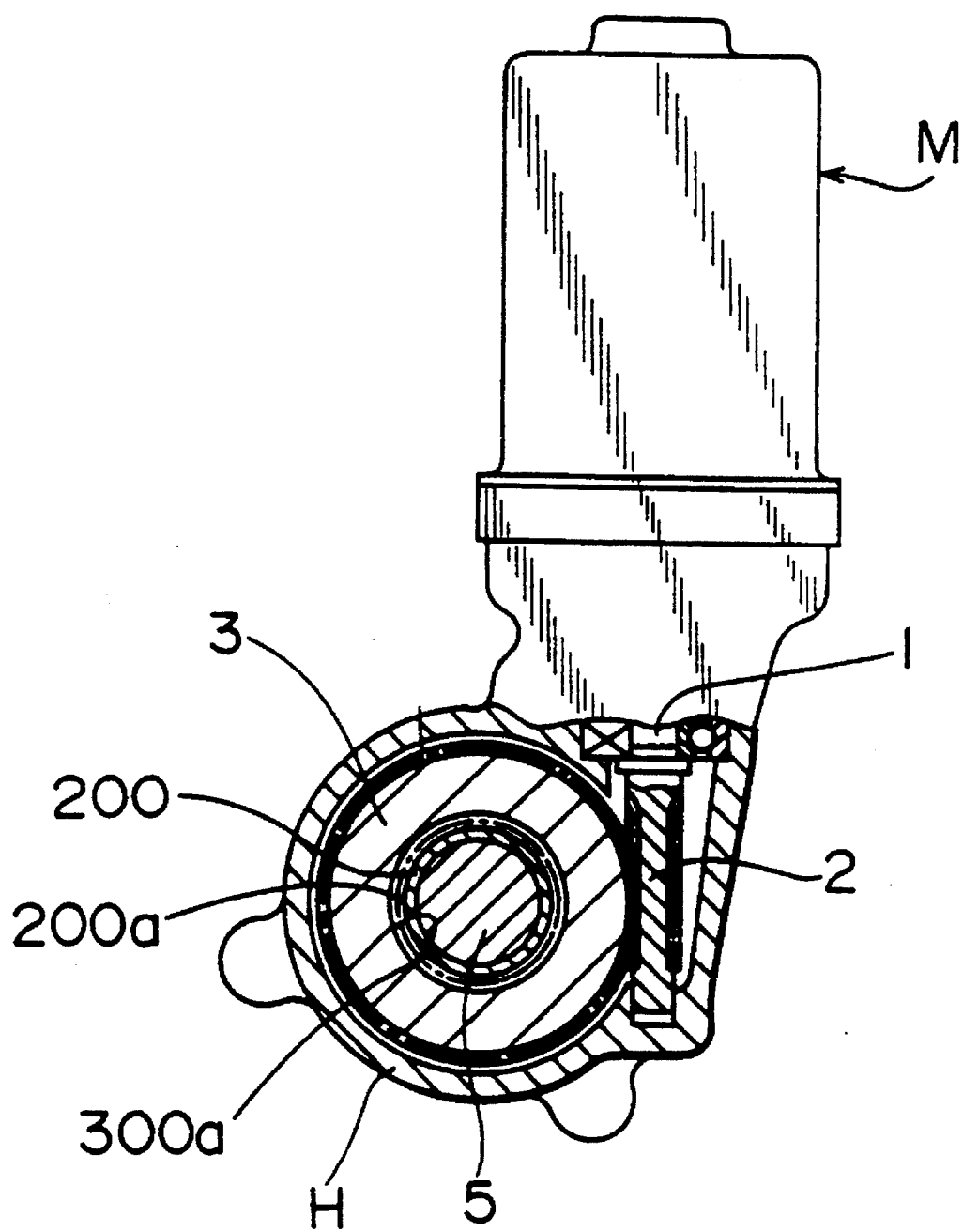
FIG. 11 is a sectional view along a line 11—11 of FIG. 10.

In FIGS. 10 and 11, a third embodiment of the invention is shown. by referring to the figures, the main differences of the third embodiment from FIG. 1 are described below. that is, in the embodiment of FIG. 1, the worm wheel 3 and the trapezoidally-threaded female screw member 300 are separately provided. On the contrary, in this embodiment, a worm wheel 3 is formed integrally with a trapezoidally-threaded female screw member 3000. An end part of the trapezoidally-threaded female screw member 3000 is increased in diameter in comparison with other parts thereof, and the worm wheel 3 is formed in the diameter increased part. As other parts are identical to those of the embodiment shown in FIG. 1, they are depicted by using same reference symbols in the figures, and not described here.

In the third embodiment, operations and effects similar to those of the embodiment in FIG. 1 are provided. In addition, because the worm wheel 3 is integrally formed with the trapezoidally-threaded screw member 3000, a reduction in weight is achievable, and manufacturing costs can be saved.

FOURTH EMBODIMENT

Figure 12:
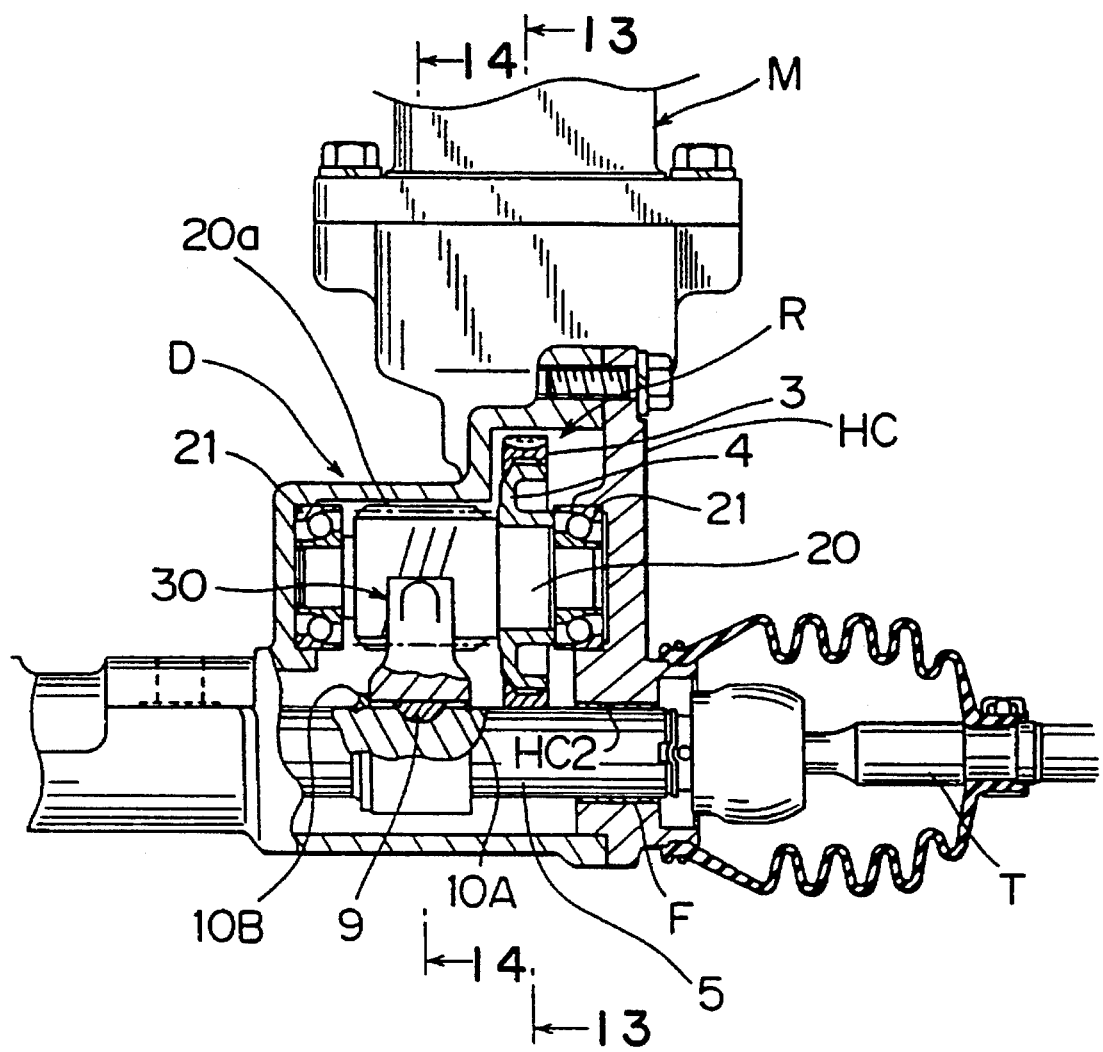
FIG. 12 is a partially sectioned side view showing main parts of a steering apparatus for the rear wheels including a drive train according to a fourth embodiment of the invention.

In FIG. 12 or 14, a fourth embodiment of the invention is shown. By referring to the figures, the main differences of the embodiment from FIG. 1 are described below.
1) In the embodiment of FIG. 1, both trapezoidally-threaded male and female screw member 200 and 300 are provided concentrically with the steering shaft 5 of the rear wheels. In comparison, in the present embodiment, a trapezoidally-threaded female screw member 30 is provided concentrically with a steering shaft 5 of the rear wheels, while a trapezoidally-threaded male screw member 20 is provided about an axial line parallel to the steering shaft 5 of rear wheels.

Figure 13:
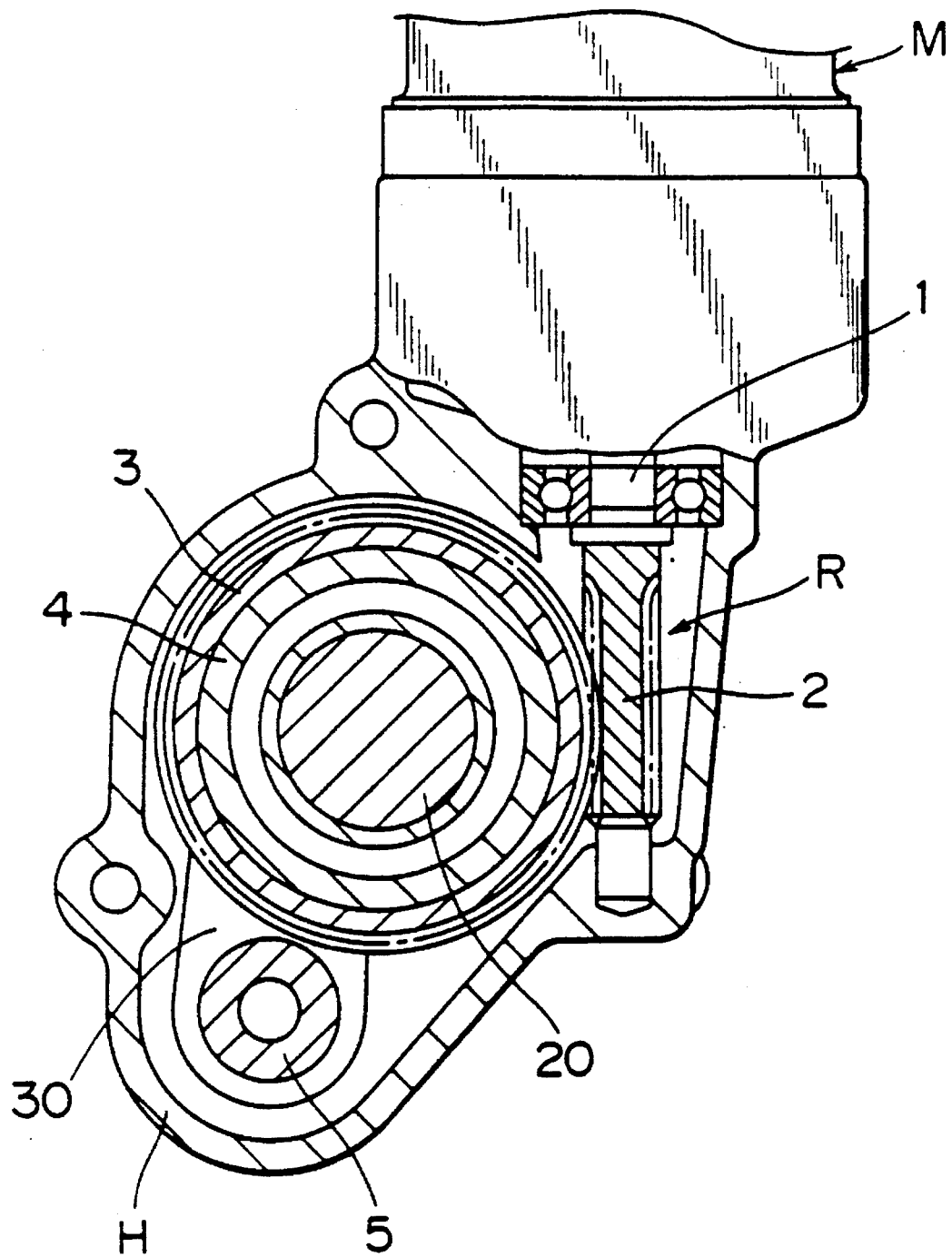
FIG. 13 is a sectional view along a line 13—13 of FIG. 12.

In referring to FIG. 12, the trapezoidally-threaded male screw member 20 comprises a shaft member with both ends thereof rotatably supported by a housing H through a bearing 21. The axial direction of the trapezoidally-threaded male screw member 20 is set to be parallel with that of the steering shaft 5 of the rear wheels. In an axially positioned central portion of the outer circumference of the trapezoidally-threaded male screw member 20, a male screw portion 20*a* with a trapezoid thread is formed over the entire portion. In FIGS. 12 and 13, the worm wheel 3 is rotatably supported by the housing H through the trapezoidally-threaded male screw member 20 and a fitting member 4.

In Fit. 14, a through hole 32 is employed in a base end part 31 of the trapezoidally-threaded female screw member 30, and the steering shaft 5 of rear wheels is inserted therethrough. The trapezoidally-threaded female screw member 30 and steering shaft 5 of the rear wheels are keyed and combined by means of a woodruff key placed in the through hole, and relative rotation of the trapezoidally-threaded female screw member 30 to the steering shaft 5 of rear wheels is thereby prevented. In addition, in FIG. 12, the trapezoidally-threaded female screw member 30 is prevented from being shifted in the axial direction relative to the steering shaft 5 of the rear wheels by a snap ring 10A and caulking member 10b which are fitted in an outer circumferential groove of the steering shaft 5 of rear wheels, and abutted to the ends in the axial direction of trapezoidally-threaded female screw member 30, respectively. As shown in FIG. 14, a female screw portion 30*a* for engagement with a male screw portion 20*a* over ¼ of the circumference of trapezoidally-threaded male screw member 20 is formed in a leading end part 33 of the trapezoidally-threaded female screw member 30.

2) In the embodiment of FIG. 1, the trapezoidally-threaded male screw member 200 is forced against the trapezoidally-threaded female screw member 300 through the steering shaft 5 of rear wheels by the backlash adjusting mechanism E. However, a backlash adjusting mechanism E of the present embodiment directly forces the trapezoidally-threaded female screw member 30 to the trapezoidally-threaded male screw member 20. In this fourth embodiment, a bushing F comprising a low friction member is placed between an inner circumferential surface of a through hole HC2 in a cap HC and an outer circumferential surface of the steering shaft 5 of rear wheels, and the steering shaft 5 of rear wheels is thereby supported in the diametral direction so as to be slidable in the axial direction.

Referring now to FIG. 14, the backlash adjusting mechanism E of the embodiment is described. The backlash adjusting mechanism E comprises a movable member E1 made of resin and abutted to a backside surface part 32 of the female screw portion 30*a* of trapezoidally-threaded female screw member 30, a threaded member E2 locked in a tapped hole Hc that is formed in the housing H, a compression coil spring E3 interposed between the threaded member E2 and movable member E1 as forcing means for pressing the movable member E1 to the backside surface 34 and a lock nut E4 for locking the threaded member E2 to the housing H.

The movable member E1 comprises a cylinder with a bottom and a concave part E11 for accommodating the coil spring, and an end surface E12 thereof is in contact with the backside surface 34 of trapezoidally-threaded female screw member 30. The threaded member E2 is provided with a threaded part E21 in an outer circumference thereof, and comprises an embedded plug having a wrench hole E22 in an end surface for introduction of and engagement with a hexagonal wrench in an end surface. A position of screwing the threaded member E2 in is set in such manner that a predetermined spacing (for example, about 0.96 to 9.09 mm, although not shown) is assured between an end surface E23 of the threaded member E2 and an end surface 13 of the movable member E1.

The compression coil spring E3 is, as it is accommodated in the concave part E11 for accommodation of the coil spring in the movable member E1, placed between the end surface E23 of threaded member E2 and a bottom surface of the concave part E11 for accommodation of the coil spring. The compression coil spring E3 elastically forces the trapezoidally-threaded female screw member 30 in the clockwise direction in FIG. 1 through the movable member E1, and the female screw portion 30*a* is thereby pressed to the male screw portion 20*a*, thus, eliminating play in the axial direction between the trapezoidally-threaded screw members 20 and 30. Specifically, even when the trapezoidally-threaded male screw member 20 is eccentrically rotated, the trapezoidally-threaded female screw member 30 that is forced elastically can follow it, as the female screw portion 30*a* is pressed toward the male screw portion 20*a*.

On the other hand, when the trapezoidally-threaded male screw member 20 is subjected to a load through the steering shaft 5 of the rear wheels due to a collision of the rear wheels against a curb stone or the like, and the trapezoidally-threaded female screw member 30 is thereby shifted in the approaching direction of the trapezoidally-threaded male screw member 20, as the movable member E1 comes in contact with the threaded member E2, the load is received through the movable member E1, threaded member E2 and housing H. In such an operation, because the movable member E1 comprising a resin is contracted elastically, and absorbs the impact, the screw portions 20a, 30a and the like are prevented from being damaged.

According to the fourth embodiment, the trapezoidally-threaded male screw member 20 is driven and rotated by the motor M through the reduction mechanism R, the trapezoidally-threaded female screw member 30 in engagement with the trapezoidally-threaded male screw member 20 is shifted in the axial direction integrally with the steering shaft 5 of the rear wheels, and the rear wheels are steered, accordingly.

Additionally, the female screw portion 30a of trapezoidally-threaded female screw member 30 is elastically forced against the male part 20a by means of the backlash removing mechanism E including the compression coil spring E3. Therefore, even when the trapezoidally-threaded male screw member 20 is eccentrically rotated, the trapezoidally-threaded female screw member 30 is rotated about the steering shaft 5 of rear wheels (the rotational angle is at a level close to zero), while compression between the female screw portion 30a and male screw portion 20a is assured. As a result, any play in the axial direction of the trapezoidally-threaded female screw member 30 in relation to the trapezoidally-threaded male screw member 20 can be eliminated. Accordingly, the rotational motion of motor M can be converted without delay to a linear motion of the steering shaft 5 of the rear wheels. Thus, steering stability is increased, and noise caused by such play can be prevented.

Moreover, in the fourth embodiment, because relative rotation of the steering shaft 5 of rear wheels to the housing H is controlled by the backlash adjusting mechanism E, no mechanism for rotating the steering shaft 5 of the rear wheels is separately required. Therefore, manufacturing costs can be reduced.

The invention is not limited to the embodiments described above, but practically applicable in a combined form of the embodiments, and various modifications are allowed in designing without departing from the scope of the invention.

What is claimed is:

1. A drive train of a steering apparatus for steering rear wheels of a vehicle by shifting a steering shaft of the rear wheels in the axial direction by means of a driving force of a rotary motor, for transmitting the driving force of the motor to the steering shaft of the rear wheels, said drive train comprising:

a reduction mechanism for receiving said driving force from said motor;

a converting mechanism, driven by said reduction mechanism for converting a rotational motion of said motor to a linear motion for steering the rear wheels;

said reduction mechanism including a worm for driving connection to said motor, and a worm wheel in meshing engagement with said worm;

said converting mechanism comprising a screw-threaded mechanism;

said screw-threaded mechanism including a trapezoidally-threaded male screw member having a male screw portion with a trapezoid thread formed in an outer circumference thereof, and a trapezoidally-threaded female screw member with a trapezoid thread formed in an inner circumference thereof for engagement with said male screw portion, and one of said trapezoidally-threaded male and female screw members being driven by said worm wheel, and the other having means for being fixed to said steering shaft of the rear wheels; said converting mechanism in combination with said reduction mechanism having a transmission efficiency equal to zero in transmitting driving force from said steering shaft of the rear wheels to said motor;

said trapezoidally-threaded female and male screw members being tubular in shape for mounting concentric with the steering shaft of the rear wheels;

said trapezoidally-threaded female screw member having means for being rotatably supported by a housing of said steering apparatus for steering rear wheels;

a backlash adjusting mechanism for adjusting a backlash of said screw-threaded mechanism, said backlash adjusting mechanism including an elastic biasing member for biasing said trapezoidally-threaded male screw member toward said trapezoidally-threaded female screw member so that said male and female screw members are elastically pressed against each other with respective portions thereof being engaged;

said backlash adjusting mechanism further comprising a sliding member placed between said elastic biasing member and a member biased by said elastic biasing member, said sliding member being slidable in a predetermined direction relative to said housing of said steering apparatus;

said sliding member having a steering shaft rotation preventing means for preventing the steering shaft of the rear wheels from rotating relative to said housing of said steering apparatus; and said steering shaft rotation preventing means comprising clamping portions for clamping a pair of parallel flat surfaces formed on an outer circumference of the steering shaft of the rear wheels.

2. The drive train of claim 1, wherein said clamping portions comprise a self-lubricating resin.

* * * * *